(12) United States Patent
Li (10) Patent No.: US 9,613,396 B2
(45) Date of Patent: Apr. 4, 2017

(54) METHOD AND APPARATUS FOR DEMOSAICING OF COLOR FILTER ARRAY IMAGE

(71) Applicant: Marvell World Trade Ltd., St. Michael (BB)

(72) Inventor: Huai Dong Li, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 170 days.

(21) Appl. No.: 14/539,754

(22) Filed: Nov. 12, 2014

(65) Prior Publication Data

US 2015/0163465 A1 Jun. 11, 2015

Related U.S. Application Data

(60) Provisional application No. 61/913,652, filed on Dec. 9, 2013.

(51) Int. Cl.
*G06T 3/40* (2006.01)
*H04N 9/04* (2006.01)

(52) U.S. Cl.
CPC .......... *G06T 3/4015* (2013.01); *H04N 9/045* (2013.01)

(58) Field of Classification Search
CPC .............................. H04N 9/045; G06T 3/4015
USPC ................................ 348/222.1, 241, 272, 273
See application file for complete search history.

(56) References Cited

U.S. PATENT DOCUMENTS

| 5,629,734 | A   | * | 5/1997 | Hamilton, Jr. | ........ | G06T 3/4007 |
|           |     |   |        |              |          | 348/222.1 |
| 7,088,392 | B2  | * | 8/2006 | Kakarala     | ........ | G06T 3/4007 |
|           |     |   |        |              |          | 348/222.1 |
| 9,111,365 | B2  | * | 8/2015 | Park         | ........ | G06T 3/4015 |
| 2007/0002154 | A1 | * | 1/2007 | Kang         | ........ | H04N 9/045 |
|           |     |   |        |              |          | 348/272 |
| 2013/0027590 | A1 | * | 1/2013 | Park         | ........ | G06T 5/002 |
|           |     |   |        |              |          | 348/241 |

* cited by examiner

*Primary Examiner* — Lin Ye
*Assistant Examiner* — Chriss Yoder, III (57) ABSTRACT

Embodiments include a method comprising: receiving a source image comprising a plurality of pixels, wherein individual pixels of the plurality of pixels of the source image comprise a corresponding pixel value that is associated with a corresponding color of a plurality of colors, and wherein a first pixel of the plurality of pixels of the source image comprises a first pixel value that is associated with a first color of the plurality of colors; and for the first pixel of the plurality of pixels of the source image, estimating (i) a second pixel value that is associated with a second color of the plurality of colors and (ii) a third pixel value that is associated with a third color of the plurality of colors.

13 Claims, 6 Drawing Sheets

METHOD AND APPARATUS FOR DEMOSAICING OF COLOR FILTER ARRAY IMAGE

CROSS REFERENCE TO RELATED APPLICATIONS

The present disclosure claims priority to U.S. Provisional Patent Application No. 61/913,652, filed on Dec. 9, 2013, which is incorporated herein by reference in its entirety.

TECHNICAL FIELD

Embodiments of the present disclosure relate to image processing, and in particular to method and apparatus for demosaicing of an image generated via a color filter array.

BACKGROUND

Color image sensors (e.g., color films, digital cameras using CCD or CMOS sensors, or the like) generally sense light intensities in a finite number of distinct spectral components. Various types of color image sensors differ in how they separate and measure the distinct spectral components. For example, digital cameras or other man-made color image sensor arrangements generally use a spatial color filter array (CFA), e.g., a Bayer color filter array, positioned over an image sensor to capture different spectral components of light in corresponding nominal pixel types.

A three-color CFA is used in many digital image sensors. A Bayer filter mosaic is a CFA for arranging red (R), green (G) and blue (B) color filters on a square grid of photosensors. The filter pattern is typically 50% green, 25% red and 25% blue. A CFA comprises a mosaic of color filters in front of an image sensor. For example, the image sensor comprises an array of pixel sensors, and the CFA comprises an array of color filters, such that each filter of the CFA is overlaid over a corresponding pixel sensor of the image sensor. A typical CFA comprises alternating red (R) and green (G) filters for odd rows, and alternating green (G) and blue (B) filters for even rows (although any other different arrangement of the R, G and B filters may also be possible), with each filter being overlaid over a corresponding pixel of the image sensor.

Since each pixel of the image sensor is behind a corresponding color filter, the output of the image sensor is an array of pixel values, each indicating a raw intensity of light of one of the three colors from the corresponding pixel of the image sensor. That is, since individual pixels of the image sensor is filtered to record only one of three colors, the data from each pixel does not fully determine the three colors on its own.

To obtain a full-color image, various demosaicing algorithms can be used to interpolate a set of complete red, green, and blue values for each pixel of the image sensor. For example, for a pixel that is overlaid with a green filter of the CFA, the image sensor outputs raw intensity of green light corresponding to the pixel. A demosaicing algorithm aims to interpolate pixel values of red and blue color for the pixel. Thus, a demosaicing algorithm is a digital image process used to reconstruct a full color image from incomplete color samples output from an image sensor overlaid with a CFA. The demosaicing algorithm is also referred to as de-mosaicing, demosaicking or debayering, CFA interpolation, color reconstruction, or the like. To ensure clarity and quality of the image resulting from the demosaicing algorithm, it is desirable to have an effective demosaicing algorithm.

SUMMARY

In various embodiments, the present disclosure provides a method comprising: receiving a source image comprising a plurality of pixels, wherein individual pixels of the plurality of pixels of the source image comprise a corresponding pixel value that is associated with a corresponding color of a plurality of colors, and wherein a first pixel of the plurality of pixels of the source image comprises a first pixel value that is associated with a first color of the plurality of colors; and for the first pixel of the plurality of pixels of the source image, estimating (i) a second pixel value that is associated with a second color of the plurality of colors and (ii) a third pixel value that is associated with a third color of the plurality of colors, wherein estimating the second pixel value and the third pixel value comprises: generating a pixel window comprising (i) the first pixel and (ii) a group of pixels of the plurality of pixels that surrounds the first pixel, based on the pixel window, generating one or more horizontal color gradient values and one or more vertical color gradient values, based on the one or more horizontal color gradient values and the one or more vertical color gradient values, classifying the first pixel to be included in one of a plurality of types of regions of the source image, and based on classifying the first pixel to be included in one of the plurality of types of regions of the source image, estimating, for the first pixel, (i) the second pixel value that is associated with the second color of the plurality of colors and (ii) the third pixel value that is associated with the third color of the plurality of colors. In an embodiment, the method further comprises: generating the source image using a color filter array and an image sensor, wherein the image sensor comprises a plurality of pixel sensors, wherein the color filter array comprises a plurality of color filters, wherein each color filter of the plurality of color filters of the color filter array is configured to output light of a corresponding color of the plurality of colors, wherein each color filter of the plurality of color filters of the color filter array is overlaid over a corresponding pixel sensor of the plurality of pixel sensors of the image sensor, wherein a first color filter of the plurality of color filters of the color filter array is configured to (i) output light of the first color and (ii) be overlaid over a first pixel sensor of the plurality of pixel sensors of the image sensor, and wherein the first pixel sensor of the plurality of pixel sensors of the image sensor generates the first pixel value of the first pixel of the source image. In an embodiment, generating the one or more horizontal or vertical color gradient values comprises: generating a first color gradient value based on a first plurality of color gradients, each of the first plurality of color gradients based on a corresponding color difference between two or more corresponding horizontal or vertical pixels of a same corresponding color of the plurality of colors; and generating a second color gradient value based on a second plurality of color gradients, each of the second plurality of color gradients based on a corresponding color difference between two or more corresponding horizontal or vertical pixels of two or more corresponding colors of the plurality of colors. In an embodiment, the plurality of types of regions of the source image comprises a vertical edge area of the source image, a horizontal edge area of the source image, a non-edge area of the source image, and a busy area of the source image. In an embodiment, classifying the first pixel to be included in one of the plurality of types of regions of the source image comprises: generating an initial classification of the first pixel in which the first pixel is initially classified to be included in one of the plurality of types of regions of the source image; and selectively refining the initial classification of the first pixel to generate a final classification of the first pixel.

In various embodiments, the present disclosure provides an apparatus comprising: an image sensor configured to generate a source image comprising a plurality of pixels, wherein individual pixels of the plurality of pixels of the source image comprise a corresponding pixel value that is associated with a corresponding color of a plurality of colors, and wherein a first pixel of the plurality of pixels of the source image comprises a first pixel value that is associated with a first color of the plurality of colors; and a demosaicing module configured to, for the first pixel of the plurality of pixels of the source image, estimate (i) a second pixel value that is associated with a second color of the plurality of colors and (iii) a third pixel value that is associated with a third color of the plurality of colors, wherein the demosaicing module comprises: a pixel window generation module configured to generate a pixel window comprising (i) the first pixel and (ii) a group of pixels of the plurality of pixels that surrounds the first pixel, a color gradient generation module configured to, based on the pixel window, generate one or more horizontal color gradient values and one or more vertical color gradient values, a pixel classification module configured to, based on the one or more horizontal color gradient values and the one or more vertical color gradient values, classify the first pixel to be included in one of a plurality of types of regions of the source image, and a pixel value estimation module configured to, based on the classification of the first pixel, estimate, for the first pixel, (i) the second pixel value that is associated with the second color of the plurality of colors and (ii) the third pixel value that is associated with the third color of the plurality of colors. In an embodiment, the apparatus further comprises: a color filter array, wherein the image sensor comprises a plurality of pixel sensors, wherein the color filter array comprises a plurality of color filters, wherein each color filter of the plurality of color filters of the color filter array is configured to output light of a corresponding color of the plurality of colors, wherein each color filter of the plurality of color filters of the color filter array is overlaid over a corresponding pixel sensor of the plurality of pixel sensors of the image sensor, wherein a first color filter of the plurality of color filters of the color filter array is configured to (i) output light of the first color and (ii) be overlaid over a first pixel sensor of the plurality of pixel sensors of the image sensor, and wherein the first pixel sensor of the plurality of pixel sensors of the image sensor generates the first pixel value of the first pixel of the source image. In an embodiment, the color gradient generation module is configured to generate the one or more horizontal color gradient values and the one or more vertical color gradient values by: generating a first horizontal color gradient value based on a first plurality of horizontal color gradients, each of the first plurality of horizontal color gradients based on a corresponding color difference between two or more corresponding horizontal pixels of a same corresponding color of the plurality of colors; generating a second horizontal color gradient value based on a second plurality of horizontal color gradients, each of the second plurality of horizontal color gradients based on a corresponding color difference between two or more corresponding horizontal pixels of two or more corresponding colors of the plurality of colors; generating a first vertical color gradient value based on a first plurality of vertical color gradients, each of the first plurality of vertical color gradients based on a corresponding color difference between two or more corresponding vertical pixels of a same corresponding color of the plurality of colors; and generating a second vertical color gradient value based on a second plurality of vertical color gradients, each of the second plurality of vertical color gradients based on a corresponding color difference between two or more corresponding vertical pixels of two or more corresponding colors of the plurality of colors. In an embodiment, the plurality of types of regions of the source image comprises a vertical edge area of the source image, a horizontal edge area of the source image, a non-edge area of the source image, and a busy area of the source image. The pixel classification module is configured to classify the first pixel to be included in one of the plurality of types of regions of the source image by: generating an initial classification of the first pixel in which the first pixel is initially classified to be included in one of the plurality of types of regions of the source image; and selectively refining the initial classification of the first pixel to generate a final classification of the first pixel. In an embodiment, the apparatus is included in one of a digital camera, a camcorder or a scanner.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

I. System Architecture

Figure 1:
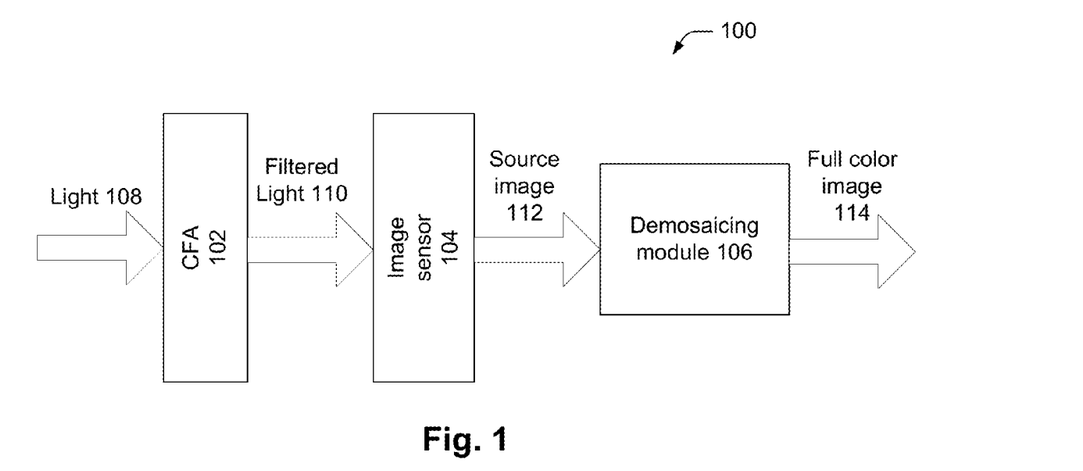
FIG. 1 schematically illustrates a system comprising a demosaicing module for demosaicing a source image and generating a full color image.

FIG. 1 schematically illustrates a system 100 comprising a demosaicing module 106 (henceforth referred to as "module 106") for demosaicing a source image 112 and generating a full color image 114. The system 100 is included in any digital image sensing device, e.g., a digital camera, a camcorder, a scanner, and/or the like.

The system 100 comprises an image sensor 104, over which a color filter array (CFA) 102 is overlaid. The image sensor 104 comprises an array of pixel sensors, and the CFA 102 comprises an array of color filters, such that each filter of the CFA 102 is overlaid over a corresponding pixel sensor of the image sensor 104.

Figure 2:
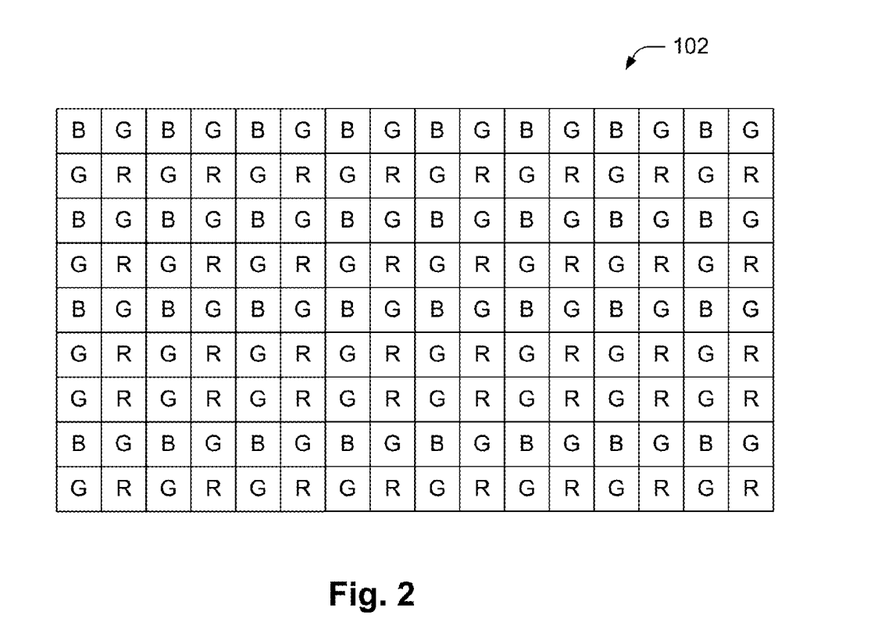
FIG. 2 illustrates an example of a CFA of the system of FIG. 1.

FIG. 2 illustrates an example of the CFA 102 of the system 100 of FIG. 1. The CFA 102 comprises an example mosaic pattern with red, blue and green color transmissive filters arranged in a repeating pattern. For example, the CFA 102 has alternating red and green filters for even rows, and alternating green and blue filters for odd rows. There are twice as many green filters as red or blue ones, catering to the human eye's higher sensitivity to green light. Each filter is overlaid over a corresponding pixel sensor of the image sensor 104.

In an example, the CFA 202 receives light 108, and selectively filters the light to generate filtered light 110. The light 208, for example, is filtered by each filter of the CFA 102 to generate corresponding portion of the light 110. For example, a portion of the light 110 filtered by a red filter of the CFA 102 will substantially include red light only. Thus, the light 110 will have a plurality of portion, with each portion being generated by a corresponding filter of the CFA 102 and will have a corresponding one of red, green or blue colors.

The image sensor 104 receives the filtered light 110. The image sensor 104 has the array of pixel sensors, with each pixel sensor being overlaid by the corresponding filter of the CFA 102. Thus, each pixel sensor of the image sensor 104 receives a portion of the light 110 having a specific color. The image sensor 104 generates the source image 112. Each pixel of the source image 112 is generated by a corresponding pixel sensor of the image sensor 112. Thus, each pixel of the source image 112 has one of R, G or B colors. As the source image 112 is generated based on the CFA 102, the source image 112 is also referred to as a color filter array image (or an image generated via a color filter array).

The module 106 receives the source image 112, and generates a full color image 114, e.g., by applying a demosaicing algorithm to the source image 112. For example, if a pixel of the source image 112 has red color component only, the module 106 interprets or estimates, using the demosaicing algorithm, a green color component and a blue color component for the pixel while generating the full color image 114.

Figure 3A:
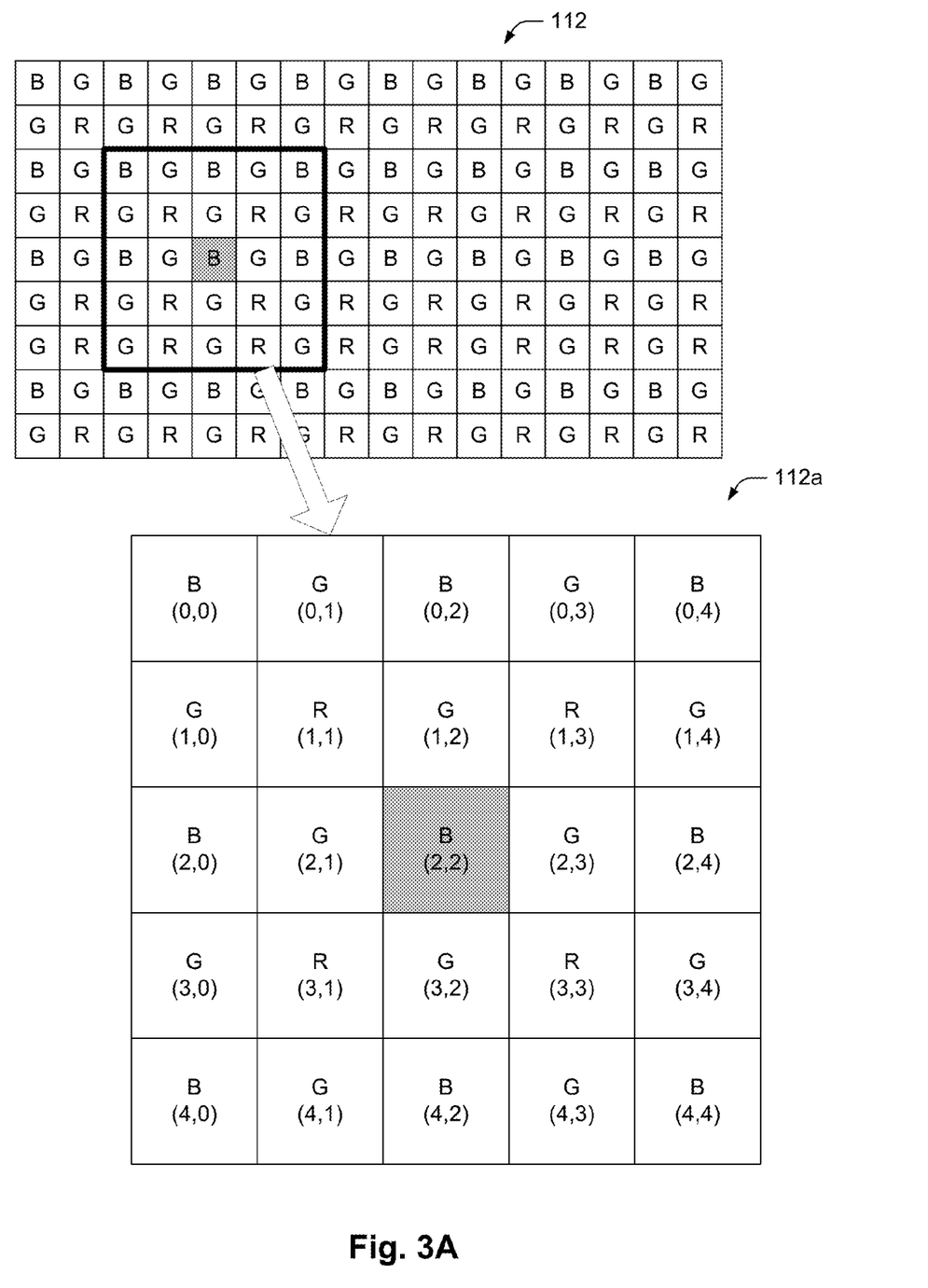
FIGS. 3A-3C illustrate a portion of a source image, and corresponding pixel windows generated from the source image.
Figure 3B:
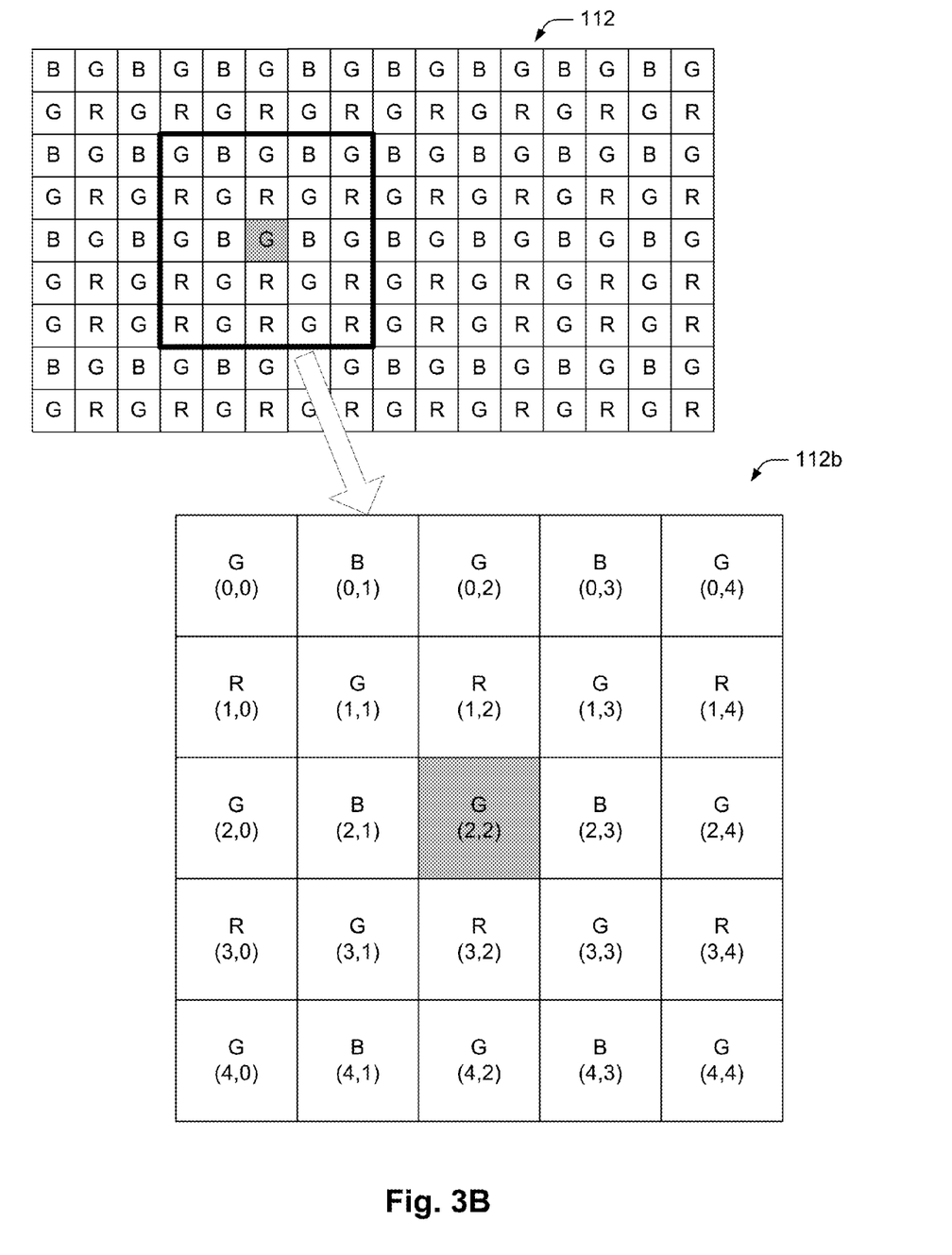
Figure 3C:
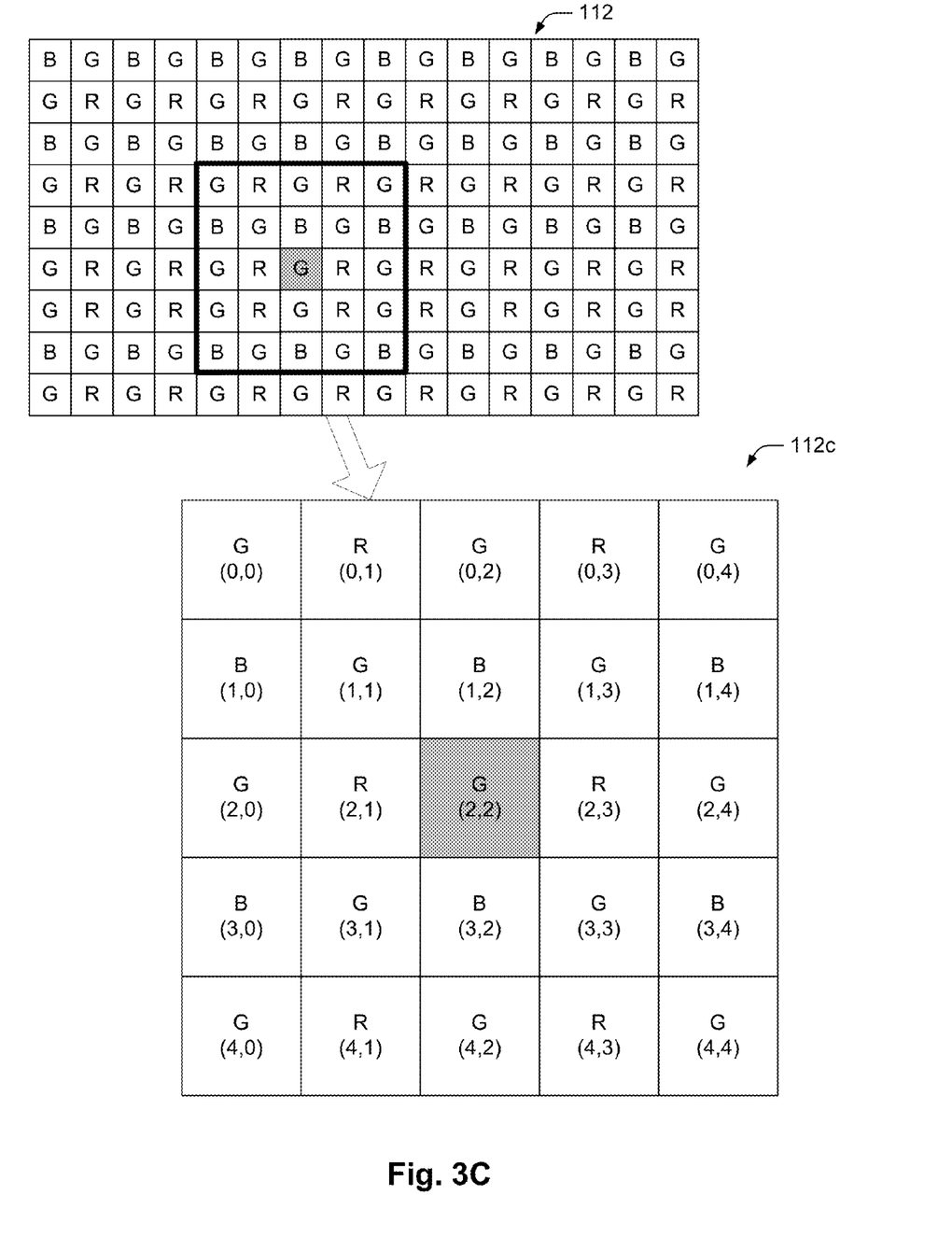

FIGS. 3A-3C illustrate a portion of the source image 112, and corresponding pixel windows generated from the source image. Referring to FIG. 3A, the source image 112 comprises a plurality of pixels, where each pixel of the source image 112 comprises a pixel value that is representative of a corresponding one of the green, blue and red colors. For example, a color of a pixel of the source image 112 corresponds to a color of a corresponding filter of the CFA 102 that is overlaid over a pixel sensor of the image sensor 104 generating the pixel of the source image 112.

For example, assume that a first filter (which is, for example, a green filter) of the CFA 102 is overlaid over a first pixel sensor of the image sensor 104. Then a first pixel of the source image 112, generated by the first pixel sensor of the image sensor 104, will have a pixel value that represents a raw intensity of green light exposed to the first pixel sensor of the image sensor 104 via the first filter of the CFA 102. For sake of simplicity, such a first pixel of the source image 112 is referred to as a green pixel. As illustrated in FIG. 3A, the source image 112 comprises a plurality of pixels (e.g., R, G and B pixels), which are arranged corresponding to the arrangement of the CFA 102.

Figure 4:
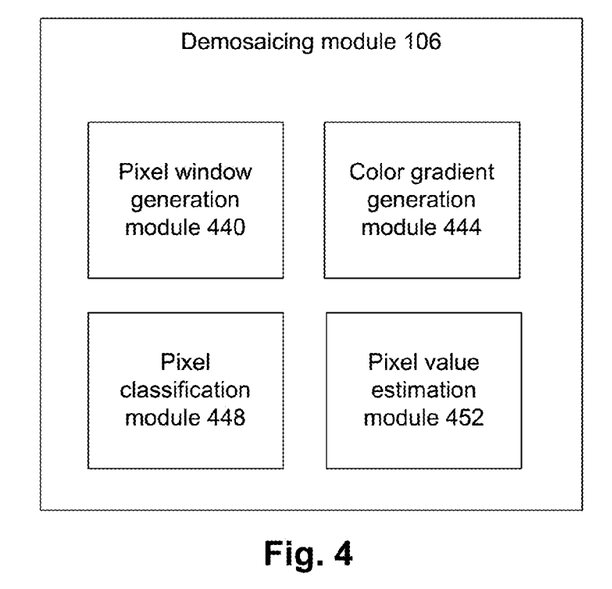
FIG. 4 schematically illustrates the demosaicing module of the system of FIG. 1.

FIG. 4 schematically illustrates the demosaicing module 106 of FIG. 1. In an embodiment, the module 106 comprises a pixel window generation module 440, a color gradient generation module 444, a pixel classification module 448, and a pixel value estimation module 452, each of which will be discussed in detail herein later.

II. Generation of a Pixel Window

The module 106 receives the source image 112, and processes the source image 112 to generate the full color image 114. Processing the source image 112 comprises generating a moving window of pixels within the source image 112. For example, while processing a first pixel of the source image 112, a pixel window generation module 440 generates a corresponding pixel window comprising (i) the first pixel and (ii) a plurality of pixels of the source image 112 that surrounds the first pixel (e.g., neighboring the first pixel) such that the first pixel is a center pixel of the pixel window. As the module 106 continues processing various pixels of the source image 112, the pixel window continues moving around the source image 112. The pixel window can be of any appropriate size, e.g., can comprise an array of 5×5 pixels, 7×7 pixels, 9×9 pixels, or the like.

FIG. 3A also illustrates generation of an example 5×5 pixel window 112a from the source image 112. Various pixels of the pixel window 112a are labeled, based on a coordinate of a location of the pixel relative to the pixel window 112a. For example, a pixel in a first row and a first column of the pixel window 112a is labeled as (0,0), a pixel in a third row and a third column of the pixel window 112a is labeled as (2,2), and so on. The (2,2) pixel of the pixel window 112a (i.e., the center pixel of the pixel window 112a) is a target pixel of the pixel window 112a. That is, the module 106 generates the pixel window 112a while processing the target pixel (2,2). In the example of FIG. 3A, the target pixel is a blue pixel (i.e., the source image 112 corresponding to the pixel (2,2) has blue pixel values only).

The pixel window 112a has a blue pixel as the target pixel (2,2), and the module 106 aims to estimate a green pixel value and a red pixel value for the target pixel (2,2), while generating the full color image 114. For example, a pixel of the full color image 114, which corresponds to the target pixel of the pixel window 112a, will have (i) the original blue pixel value from the source image 112, and (ii) the estimated green and red pixel values, as estimated by the module 106.

In this document, a pixel value of a pixel of a corresponding color within a pixel window is represented by "p," followed by the coordinate of the pixel. For example, p[0,0] in the pixel window 112a refers to the blue pixel value of the pixel (0,0); p[0,1] in the pixel window 112a refers to the green pixel value of the pixel (0,1); p[2,2] in the pixel window 112a refers to the blue pixel value of the pixel (2,2); and so on. In an example, an estimated green pixel value of, for example, the pixel (2,2) is given by G'[2,2]; and an estimated red pixel value of, for example, the pixel (2,2) is given by R'[2,2]. In another example, an estimated blue pixel value of the pixel (0,1) is given by B'[0,0]; and an estimated red pixel value of the pixel [0,1] is given by R'[2,2].

As will be discussed in detail herein later, if the target pixel of a pixel window is a green pixel or a red pixel (e.g., instead of the blue target pixel of the pixel window 112a), the processing of the target pixel will at least in part be different (e.g., relative to processing the blue target pixel). FIG. 3B illustrates a pixel window 112b, where a green pixel is the target pixel, and the green pixel has two blue pixels as its horizontal neighbors. Because the target green pixel in the pixel window 112b has two blue pixels as its horizontal neighbors, the target pixel of the pixel window 112b is also referred to as a Gb pixel. FIG. 3C illustrates a pixel window 112c, where a green pixel is the target pixel, and the green pixel has two red pixels as its horizontal neighbors. Because the target green pixel in the pixel window 112c has two red pixels as its horizontal neighbors, the target pixel of the pixel window 112c is also referred to as a Gr pixel. Although not illustrated in FIGS. 3A-3C, another pixel window can have a red pixel as the target pixel.

III. Color Gradient Generation

Once a pixel window surrounding a target pixel is generated, the color gradient generation module 444 of the module 106 (e.g., illustrated in FIG. 4) generates one or more color gradients associated with the pixel window. The generation of color gradient is same for each of the pixel windows 112a, 112b and 112c (i.e., is not based on whether the target pixel is a R, B, Gb or Gr pixel). Accordingly, the operations associated with generation of color gradient apply to each of the pixel windows 112a, 112b and 112c.

In an embodiment, once a pixel window (e.g., a 5×5 pixel window) is generated, two horizontal and two vertical color gradients are identified corresponding to the target pixel of the pixel window. A first horizontal gradient GradHor1 and a second horizontal gradient GradHor2 are determined as follows:

$$\text{GradHor1}=|2*p[2,2]-p[2,0]-p[2,4]|+|p[2,1]-p[2,3]|+ \\ (|p[1,1]-p[1,3]|+|p[3,1]-p[3,3]|)/2+(|p[0,1]-p[0,3]|+|p[4,1]-p[4,3]|)/2+(|2*p[1,2]-p[1,0]-p[1,4]|+|2*p[3,2]-p[3,0]-p[3,4]|)/4; \quad \text{Equation 1}$$

and $$\text{GradHor2}=|(p[2,3]+p[2,1])/2-p[2,2]|+|(p[3,3]+p[3,1])/2-p[3,2]|/2+|(p[1,3]+p[1,1])/2-p[1,2]|/2, \quad \text{Equation 2}$$

where the operator |x| provides the absolute value of x.

It is to be noted that equations 1 and 2 are applicable to any of the pixel windows 112a, 112b and 112c (i.e., does not depend on a color or neighboring pixels of the target pixel). For sake of simplicity, equations 1 and 2 and color gradient generation is discussed herein with respect to the pixel window 112a.

Equation 1 has a term |2*p[2,2]−p[2,0]−p[2,4]|, which is a second order horizontal color gradient (e.g., color differences) between (i) the blue pixel (2,2) and (ii) blue pixels (2,0) and (2,4) in the pixel window 122a. Equation 1 has also a term |p[2,1]−p[2,3]|, which represents a first order horizontal color gradient (e.g., color differences) between green pixels (2,1) and (2,3). Similarly, Equation 1 has also a term |p[1,1]−p[1,3]|, which represents a first order horizontal color gradient (e.g., color differences) between red pixels (1,1) and (1,3). Thus, individual ones of the various terms or components in GradHor1 of equation 1 represents a corresponding horizontal color gradient or horizontal color differences between pixels values of corresponding two or more pixels of the same color, where the two or more pixels are in a same horizontal line. That is, individual ones of the various terms or components in GradHor1 of equation 1 represents a corresponding horizontal color gradient or horizontal color differences within the same color channel.

Equation 2 has a term |(p[2,3]+p[2,1])/2−p[2,2]|, which is a second order horizontal color gradient (e.g., color differences) between (i) green pixels (2,3) and (2,1) and (ii) the blue pixel (2,2) in the pixel window 122a. Equation 2 has also a term |(p[3,3]+p[3,1])/2−p[3,2]|, which represents a second order horizontal color gradient between (i) red pixels (3,3) and (3,1) and (ii) the green pixel (3,2). Similarly, Equation 2 has also a term |(p[1,3]+p[1,1])/4−p[1,2]|, which represents a second order horizontal color gradient between (i) red pixels (1,1) and (1,3) and (ii) the green pixel (1,2). Thus, individual ones of the various terms or components in GradHor2 of equation 2 represent a corresponding horizontal color gradient or horizontal color differences between pixels values of corresponding two or more pixels of different colors, where the two or more pixels are in a same horizontal line. That is, individual ones of the various terms or components in GradHor2 of equation 2 represents a corresponding horizontal color gradient or horizontal color differences within cross color channels.

A first vertical gradient GradVer1 and a second vertical gradient GradVer2 is determined as follows:

$$\text{GradVer1}=|2*p[2,2]-p[0,2]-p[4,2]|+|p[1,2]-p[3,2]|+ \\ (|p[1,1]-p[3,1]|+|p[1,3]-p[3,3]|)/2+(|p[1,0]-p[3,0]|+|p[1,4]-p[3,4]|)/2+(|2*p[2,1]-p[0,1]-p[4,1]|+|2*p[2,3]-p[0,3]-p[4,3]|)/4; \quad \text{Equation 3}$$

and $$\text{GradVer2}=|(p[3,2]+p[1,2])/2-p[2,2]|+|(p[3,3]+p[1,3])/4-p[2,3]|/2+|(p[3,1]+p[1,1])/2-p[2,1]|/2. \quad \text{Equation 4}$$

Similar to equation 1, in the Gradver1 in equation 3, individual ones of the various terms or components in GradVer1 of equation 3 represent a corresponding vertical color gradient or vertical color differences between pixels values of corresponding two or more pixels of the same color, where the two or more pixels are in a same vertical line. That is, individual ones of the various terms or components in GradVer1 of equation 3 represent a corresponding vertical color gradient or vertical color differences within the same color channel.

Also, similar to equation 1, individual ones of the various terms or components in GradVer2 of equation 4 represent a corresponding vertical color gradient or vertical color differences between pixels values of corresponding two or more pixels of different colors, where the two or more pixels are in a same vertical line. That is, individual ones of the various terms or components in GradVer2 of equation 4 represent a corresponding vertical color gradient or vertical color differences within cross color channels.

IV. (a) Pixel Classification

Subsequent to the determination of horizontal and vertical gradients associated with a pixel window, a target pixel of the pixel window is classified in one of a plurality of categories (e.g., is classified to be included in one of a plurality of types of regions of the source image 112). For example, the pixel classification module 448 of the module 106 of FIG. 4 classifies the target pixel.

The pixel classification is same for each of the pixel windows 112a, 112b and 112c (i.e., is not based on whether the target pixel is a R, B, Gb or Gr pixel). Accordingly, the operations associated with classifying a target pixel apply to each of the pixel windows 112a, 112b and 112c. For sake of simplicity and unless otherwise mentioned, pixel classification of a target pixel is discussed herein with respect to the pixel window 112a.

Figure 5:
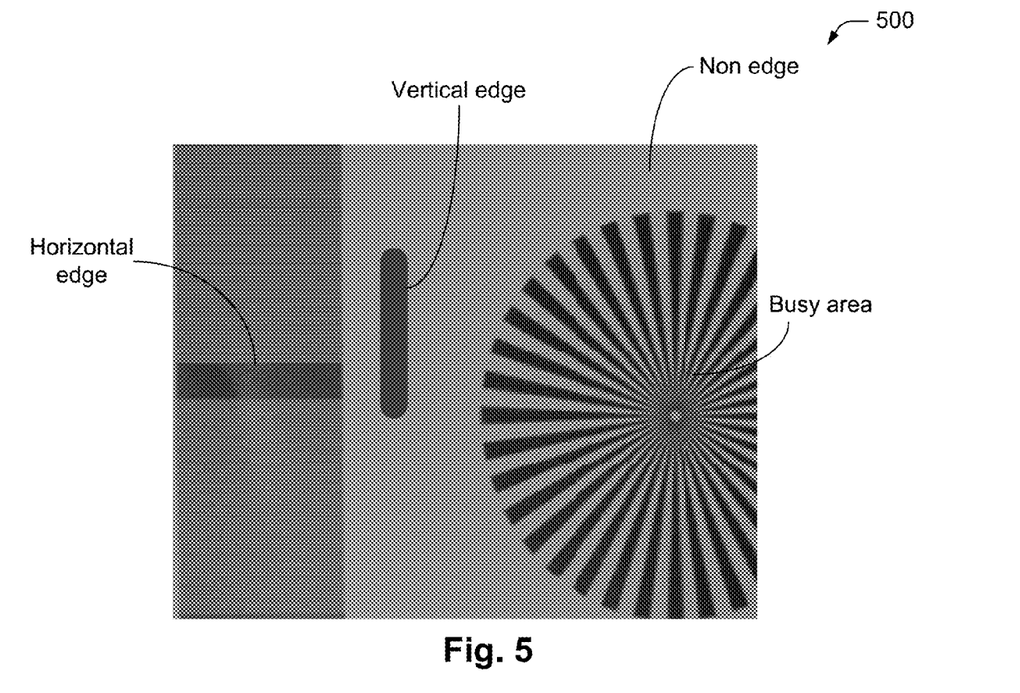
FIG. 5 illustrates an example of an image.

In an example, a target pixel is classified to belong to one of a horizontal edge, a vertical edge, a non-edge or a busy area of the source image 112. FIG. 5 illustrates an example image 500. FIG. 5 also illustrates various example types of regions of the image 500, e.g., a horizontal edge, a vertical edge, a non-edge and a busy area of the image 500. A target pixel being classified to be in a horizontal edge provides a strong indication or a higher probability that the target pixel lies in a horizontal edge of the image. Similarly, a target pixel being classified to be in a vertical edge provides a strong indication or a higher probability that the target pixel lies in a vertical edge of the image. Similarly, a target pixel being classified to be in a non-edge provides a strong indication or a higher probability that the target pixel does not lie near any edges or busy area of the image (e.g., lies in a smooth area of the image). A target pixel being classified to be in a busy provides a strong indication or a higher probability that the target pixel lies in an area of the image that includes crowded, irregular high contrast edges (e.g., near a text).

IV. (b) Busy Area Classification

To determine if a target pixel of a pixel window (e.g., any one of the pixel windows 112a, ..., 112c) is classified as a busy area pixel, a busy threshold value (busy_thre) is initially determined. The busy threshold value is based on the pixel values of various pixels of the pixel window (i.e., the busy threshold value is dynamically updated, based on the pixel window). In an example, the busy threshold busy_thre is determined as follows:

$$\text{busy\_thre} = \min((4*p[2,2]+p[2,1]+p[1,2]+p[2,3]+p[3,2])/16, \min\_busy\_thre), \quad \text{Equation 5}$$

where the operator min(x,y) outputs a minimum of x and y. The min_busy_thre is a minimum busy threshold, and has a pre-set user configured value. Thus, in equation 5, the busy threshold busy_thre is the minimum of (i) $(4*p[2,2]+p[2,1]+p[1,2]+p[2,3]+p[3,2])/16$ or (ii) the minimum busy threshold min_busy_thre. The term $(4*p[2,2]+p[2,1]+p[1,2]+p[2,3]+p[3,2])/16$ is an average pixel value of the target pixel and four adjacent or neighboring pixels of the target pixel, wherein the four adjacent or neighboring pixels are in the same horizontal and same vertical line as the target pixel in the pixel window.

Subsequent to generating the busy threshold busy_thre, a busy area counter busy_num is selectively incremented, based on the pixels of the pixel window. The busy area counter busy_num is selectively incremented as follows:

If $(\min(|p[2,2]-p[0,0]|,|p[2,2]-p[0,2]|,|p[0,0]-p[0,2]|) > \text{busy\_thre}$, increase busy_num by 1;  Equation 6a If $(\min(|p[2,2]-p[0,0]|,|p[2,2]-p[2,0]|,|p[0,0]-p[2,0]|) > \text{busy\_thre}$, increase busy_num by 1;  Equation 6b If $(\min(|p[2,2]-p[0,4]|,|p[2,2]-p[0,2]|,|p[0,4]-p[0,2]|) > \text{busy\_thre}$, increase busy_num by 1;  Equation 6c If $(\min(|p[2,2]-p[0,4]|,|p[2,2]-p[2,4]|,|p[0,4]-p[2,4]|) > \text{busy\_thre}$, increase busy_num by 1;  Equation 6d If $(\min(|p[2,2]-p[4,0]|,|p[2,2]-p[2,0]|,|p[2,0]-p[4,0]|) > \text{busy\_thre}$, increase busy_num by 1;  Equation 6e If $(\min(|p[2,2]-p[4,0]|,|p[2,2]-p[4,2]|,|p[4,0]-p[4,2]|) > \text{busy\_thre}$, increase busy_num by 1;  Equation 6f If $(\min(|p[2,2]-p[4,0]|,|p[2,2]-p[2,4]|,|p[2,4]-p[4,4]|) > \text{busy\_thre}$, increase busy_num by 1;  Equation 6g If $(\min(|p[2,2]-p[4,4]|,|p[2,2]-p[4,2]|,|p[4,2]-p[4,4]|) > \text{busy\_thre}$, increase busy_num by 1.  Equation 6h It is to be noted that each of the pixel values in Equations 6a-6h are of pixels of the same color. For example, if the target pixel of the pixel window 112a is being processed, then each of the pixel values in equations 6a-6h are of blue pixels (i.e., pixels (2,2), (0,0), (0,2), (2,0), (0,4), etc., which appear in equations 6a-6h, are blue pixel). In another example, if the target pixel of the pixel window 112b is being processed, then each of the pixel values of the pixels in equations 6a-6h are green pixels.

Equation 6a, for example, compares $\min(|p[2,2]-p[0,0]|, |p[2,2]-p[0,2]|, |p[0,0]-p[0,2]|)$ to the busy threshold busy_thre, and the busy area counter busy_num is selectively incremented based on the comparison. Equation 6a determines a minimum of a plurality of color differences, and compares the minimum of the plurality of color differences to the busy threshold busy_thre. Each of the plurality of color differences in equation 6a is a color difference between two pixels of the same color (which is the color of the target pixel in the source image 112). Similarly, each of equations 6b-6h compares a minimum of a corresponding plurality of color differences to the busy threshold busy_thre, and selectively increments the busy area counter busy_num based on the comparison. Individual color differences in each of equations 6b-6h is a color difference between two corresponding pixels of the same color (which is the color of the target pixel in the source image 112).

In an embodiment, subsequent to selectively incrementing the busy area counter busy_num based on equations 6a-6h, if the busy area counter busy_num is higher than a threshold value (e.g., a threshold value of 4), then the target pixel of the pixel window pixel is classified as being in a busy area, as follows:

if busy_num>4, then class_final=BUSY, if busy_num≤4, then proceed to the next operations for pixel classification,  Equation 7.

where class_final is a variable that indicates a final classification of the target target pixel. For example, if the busy_num is higher than the example the threshold value of 4, then in accordance with equation 7, the class_final is BUSY, indicating a strong probability or strong indication that the target pixel is in a busy area of the source image 112 (e.g., the target pixel is classified as being in a busy area). If the busy area counter busy_num is less than or equal to the threshold value, the pixel classification process proceeds to the next steps, as discussed herein in subsequent sections.

IV. (c) Edge, Non-Edge and Busy Area Classification

If the target pixel is not classified as being in a busy area based on equation 7, the pixel classification proceeds as follows.

Assume thre_grad1 and thre_grad2 are threshold values for classification of pixels in an edge area (e.g., horizontal edge or vertical edge) or a non edge area. The thre_grad1 and thre_grad2 are determined as follows:

$$\text{thre\_grad1} = \max(\min(\text{GradHor1},\text{GradVer1})*k\_\text{grad1}/32, \min\_\text{grad\_thr}); \quad \text{Equation 8a}$$

$$\text{thre\_grad2} = \max(\min(\text{GradHor2},\text{GradVer2})*k\_\text{grad2}/32, \min\_\text{grad\_thr}), \quad \text{Equation 8b},$$

where min_grad_thr, k_grad1 and k_grad2 are user configurable pre-determined values. The max(a,b) operator outputs a maximum of a and b; and the min(a,b) operator outputs a minimum of a and b. The thre_grad1 is determined based at least in part on GradHor1 and GradVer1, which are horizontal and vertical color gradients associated with same color channel, as discussed with respect to equations 1 and 3. The thre_grad2 is determined based at least in part on GradHor2 and GradVer2, which are horizontal and vertical color gradients associated with cross color channels, as discussed with respect to equations 2 and 4. Thus, the thre_grad1 and thre_grad2 are threshold gradients associated with same color gradient and cross color gradient, respectively.

A variable class_1 is determined as follows:

If (GradHor1>GradVer1+thre_grad1), then
class_1=VERTICAL;

Else if (GradVer1>GradHor1+thre_grad1), then
class_1=HORIZONTAL;

Else class_1=NON-EDGE.                    Equation 9a.

Another variable class_2 is determined as follows:

If (GradHor2>GradVer2+thre_grad2), then
class_2=VERTICAL;

Else if (Gradver2>Gradhor2+thre_grad2), then
class_2=HORIZONTAL;

Else class_2=NON-EDGE.                    Equation 9b.

The variable class_1 is determined based at least in part on GradHor1 and GradVer1, which are color gradients associated with same color channel, as discussed with respect to equations 1 and 3. The variable class_2 is determined based at least in part on GradHor2 and GradVer2, which are color gradients associated with cross color channels, as discussed with respect to equations 2 and 4. Thus, based on equations 9a and 9b, each of the class_1 and class_2 variables associated with the target pixel of the pixel window is assigned one of a VERTICAL, a HORIZONTAL or a NON-EDGE value. For example, referring to equation 9a, if the horizontal gradient in the same color channel (i.e., GradHor1) is higher than the vertical gradient in the same color channel (i.e., GradVer1) by at least the threshold value thre_grad1, this implies a vertical edge in the same color channel—accordingly, the variable class_1 is assigned the VERTICAL value. Similarly, in equation 9a, if the vertical gradient in the same color channel (i.e., GradVer1) is higher than the horizontal gradient in the same color channel (i.e., GradHor1) by at least the threshold value thre_grad1, this implies a horizontal edge in the same color channel—accordingly, the class_1 is assigned the HORIZONTAL value. Thus, assigning, for example, the VERTICAL value to class_1 indicates a probability or strong indication of the target pixel being on a vertical edge of the same color channel (e.g., the same color channel that the target pixel represents). Similarly, for example, assigning the VERTICAL value to class_2 indicates a probability or strong indication of the target pixel being on a vertical edge of cross color channels.

Once the class_1 and class_2 values are determined, a class_final value is determined (e.g., based on merging the class_1 and class_2 values), where the class_final value provides a final classification of the target pixel. In an embodiment, the class_final value is determined using the following:

If(class_1 = VERTICAL)                    Equation 10

{ if(class_2 = HORIZONTAL), then class_final = NON-EDGE;

else class_final = VERTICAL

} else if(class_1 = HORIZONTAL)

{ if(class_2 = VERTICAL) class_final = NON-EDGE;

-continued else class_final = HORIZONTAL;

} else class_final = class_2, .

where class_final is the variable that indicates the final classification of the target target pixel. Note that the class_final can also be classified as BUSY, as discussed previously herein with respect to equation 7. In equation 10, if the variable class_1 is assigned VERTICAL and the variable class_2 is assigned HORIZONTAL, this implies that the potential vertical edge detected in the same color channel is contradictory with the potential horizontal edge detected in the cross color channel—accordingly, the variable class_final is assigned a NON-EDGE value. However, if both the variables class_1 and class_2 are assigned VERTICAL, this implies a vertical edge for both the same color channel and cross color channel—accordingly, the variable class_final is assigned the VERTICAL value. Also, if the variable class_1 is assigned VERTICAL and the variable class_2 is assigned NON-EDGE, this implies a vertical edge for at least the same color channel—accordingly, the variable class_final is assigned a VERTICAL value. The horizontal edge assignment is also performed in a similar manner.

IV. (d) Refinement of Classification of the Target Pixel

In an embodiment, once a target pixel is classified (i.e., once the class_final is determined, as discussed with respect to equations 7 and 10), the classification of the target pixel can be selectively refined. For example, if the target pixel is classified as being a NON-EDGE (i.e., if the class_final is NON-EDGE in equation 10) and if one or more pixels surrounding the target pixel have strong edge indication (i.e., if one or more pixels surrounding the target pixel are classified as HORIZONTAL or VERTICAL), then the target pixel may be re-classified to be in the corresponding edge. Similarly, if the target pixel is classified as being a NON-EDGE (i.e., if the class_final is NON-EDGE in equation 10) and if one or more pixels surrounding the target pixel are classified as being BUSY, then the target pixel may be re-classified as being BUSY. In an embodiment, the refinement of the classification of the target pixel in a pixel window is possibly performed only if the target pixel is initially classified as being NON-EDGE (i.e., if the class_final is NON-EDGE in equation 10).

Assume num_class_busy, num_class_hor and num_class_ver represent a corresponding number of pixels within a 3×3 pixel window being classified to be in a busy area, a horizontal edge area and a vertical edge area, respectively, with the target pixel being in the center of the 3×3 pixel window. That is, for example, in the 3×3 pixel window centering the target pixel, num_class_busy number of pixels is classified to be in the busy area, num_class_hor number of pixels is classified to be in the horizontal edge area, and num_class_ver number of pixels is classified to be in the vertical edge area.

If the target pixel is initially classified as NON-EDGE, the target pixel is selectively re-classified based on the following:

(i) If (num_class_busy>num_busy_th), then re-classify class_final as BUSY;

(ii) Else if (num_class_hor>num_class_ver) and (num_class_hor>num_edge_th), then re-classify class_final as HORIZONTAL; or (iii) Else if (num_class_ver>num_class_hor) and (num_class_ver>num_edge_th), then re-classify class_final as VERTICAL,     Equation 11, where num_busy_th and num_edge_th are two user configurable pre-determined threshold values. Thus, in equation 11, (i) if the target pixel is initially classified as NON-EDGE and (ii) if the number of neighboring pixels being classified as BUSY exceeds a threshold value, the target pixel is re-classified as BUSY. Similarly, (i) if the target pixel is initially classified as NON-EDGE, (ii) if a number of neighboring pixels being classified as VERTICAL exceeds a number of neighboring pixels being classified as HORIZONTAL, and (iii) if a number of neighboring pixels being classified as VERTICAL exceeds a threshold value, the target pixel is re-classified as VERTICAL. Similarly, (i) if the target pixel is initially classified as NON-EDGE, (ii) if a number of neighboring pixels being classified as HORIZONTAL exceeds a number of neighboring pixels being classified as VERTICAL, and (iii) if a number of neighboring pixels being classified as HORIZONTAL exceeds a threshold value, the target pixel is re-classified as HORIZONTAL.

V. Pixel Value Interpolation

Once the target pixel is classified to be included in one of a plurality of types of regions of the source image (e.g., included in one of a busy area, a vertical edge area, a horizontal edge area or a non-edge area), an interpolation of the pixel values of various color channels for the target pixel is performed (e.g., by the pixel value estimation module 452 of the module 106 of FIG. 4). For example, in the pixel window 112a, the target pixel (2,2) is a blue pixel. Once the target pixel is classified, the pixel values of green and red color for the target pixel (2,2) of the pixel window 112a are interpolated or estimated.

In an embodiment, the estimation of green color for a blue or red target pixel is performed using a 5×5 pixel window (e.g., pixel window 112a). In an embodiment, the estimation of red or blue color for a green target pixel is performed using a pixel window that can range from 5×5 pixels to 9×9 pixels, as will be discussed in further detail herein later.

As previously discussed herein, a pixel value of a pixel within a pixel window is represented by "p," followed by the coordinate of the pixel. For example, p[0,0] in the pixel window 112a refers to the blue pixel value of the pixel (0,0); p[0,1] in the pixel window 112a refers to the green pixel value of the pixel (0,1); p[2,2] in the pixel window 112a refers to the blue pixel value of the pixel (2,2); and so on. In an example, an estimated green pixel value of, for example, the pixel (2,2) in the pixel window 112a is given by G'[2,2]; and an estimated red pixel value of, for example, the pixel (2,2) in the pixel window 112a is given by R'[2,2]. In another example, an estimated blue pixel value of the pixel (0,1) is given by B'[0,0]; and an estimated red pixel value of the pixel (0,1) is given by R'[2,2].

VI. (a) Green Pixel Value Estimation for a Red or a Blue Target Pixel

The pixel window 112a has a blue pixel as the target pixel, and the pixel value of the green color is estimated for the target pixel. It is to be noted that while the green pixel value estimation or interpolation is discussed herein with respect to the pixel window 112a having the blue target pixel, the teachings also apply to a pixel window with a red pixel as the target pixel (not illustrated in the figures). Also, the green pixel value estimation for a blue or red target pixel is based on a 5×5 pixel window (e.g., the pixel window 112a).

The green pixel value estimation for a blue or red target pixel is based on a classification of the target pixel. If the target pixel is classified as HORIZONTAL (i.e., if the pixel is classified as being in a horizontal edge of the image), the green pixel value for the target pixel (2,2) of the pixel window 112a is estimated as follows:

$$G'[2,2]=(p[2,1]+p[2,3])/2+\text{CLIP\_MIN\_MAX}((2*p[2,2]-p[2,0]-p[2,4])/8,-\text{comp\_limit},\text{comp\_limit}), \quad \text{Equation 12,}$$

where CLIP_MIN_MAX(x, a, b) is the clip function which clips input "x" to a minimum value of "a" and maximum value of "b". Thus, if $(2*p[2,2]-p[2,0]-p[2,4])/8$ is less than − comp_limit, then the CLIP_MIN_MAX function outputs − comp_limit. Also, if $(2*p[2,2]-p[2,0]-p[2,4])/8$ is higher than comp_limit, then the CLIP_MIN_MAX function outputs comp_limit. If $(2*p[2,2]-p[2,0]-p[2,4])/8$ is between − comp_limit and comp_limit, then the CLIP_MIN_MAX function outputs the actual value of $(2*p[2,2]-p[2,0]-p[2,4])/8$. The comp_limit has a pre-determined and user configurable value. In equation 12, the term $(p[2,1]+p[2,3])/2$ provides an average of two green pixels that are horizontally adjacent to the target pixel (2,2), e.g., due to the target pixel being classified as HORIZONTAL. The term $(2*p[2,2]-p[2,0]-p[2,4])/8$ is contribution from pixel values of cross color channels of pixels that are in the same horizontal line, and results in sharpening of the green pixel value of the target pixel.

If the target pixel is classified as VERTICAL (i.e., if the pixel is classified as being in a vertical edge of the image), the green pixel value for the target pixel (2,2) of the pixel window 112a is estimated as follows:

$$G'[2,2]=(p[1,2]+p[3,2])/2+\text{CLIP\_MIN\_Max}((2*p[2,2]-p[0,2]-p[4,2])/8,-\text{comp\_limit},\text{comp\_limit}). \quad \text{Equation 13}$$

In equation 13, the term $(p[1,2]+p[3,2])/2$ provides an average of two green pixels that are vertically adjacent to the target pixel (2,2), e.g., due to the target pixel being classified as VERTICAL. The term $(2*p[2,2]-p[0,2]-p[4,2])/8$ is contribution from pixel values of cross color channels of pixels that are in the same vertical line, and results in sharpening of the green pixel value of the target pixel.

If the target pixel is classified as BUSY or NON-EDGE (i.e., if the pixel is classified as being in a busy area or a non-edge area of the image), then the green pixel value for the target pixel (2,2) of the pixel window 112a is estimated by initially forming a plurality of color differences (CD) of pixels in the pixel window, as follows:

$$CD[2,1]=p[2,1]-(p[2,0]+p[2,2])/2; \quad \text{Equation 13a}$$

$$CD[2,3]=p[2,3]-(p[2,2]+p[2,4])/2; \quad \text{Equation 13b}$$

$$CD[1,2]=p[1,2]-(p[0,2]+p[2,2])/2; \quad \text{Equation 13c}$$

$$CD[3,2]=p[3,2]-(p[2,2]+p[4,2])/2. \quad \text{Equation 13d}$$

In equation 13a, the color difference CD[2,1] associated with the pixel (2,1) is given by $p[2,1]-(p[2,0]+p[2,2])/2$. That is, the color difference CD[2,1] is a difference in pixel value of (i) the pixel (2,1) and (ii) the two adjacent horizontal pixels. In equation 13b, the color difference CD[2,3] associated with the pixel (2,3) is given by $p[2,3]-(p[2,3]+p[2,4])/2$. That is, the color difference CD[2,3] is a difference in pixel value of (i) the pixel (2,3) and (ii) the two adjacent horizontal pixels. In equation 13c, the color difference CD[1,2] associated with the pixel (1,2) is given by p[1,2]−(p[0,2]+p[2,2])/2. That is, the color difference CD[1,2] is a difference in pixel value of (i) the pixel (1,2) and (ii) the two adjacent vertical pixels. The color difference CD[3,2] of equation 13d is also determined in a similar manner. Assume that the color differences in equations 13a-13d are in the following order:

$$CD(1)<CD(2)<CD(3)<CD(4), \qquad \text{Equation 14}$$

wherein CD(1) represents the color difference that is the minimum among the color differences in equations 13a-13d; wherein CD(4) represents the color difference that is the maximum among the color differences in equations 13a-13d, and so on. Then, if the target pixel is classified as BUSY or NON-EDGE, the green pixel value for the target pixel (2,2) of the pixel window 112a is estimated as follows:

$$G'[2,2]=(CD(2)+CD(3))/2+p[2,2]. \qquad \text{Equation 15}$$

Thus, the estimated green pixel value is based on the moderate color differences CD(2) and CD(3) among the plurality of color differences of equations 13a-13d, and does not take into account the minimum and the maximum of the plurality of color differences of equations 13a-13d.

VI. (b) Smoothing of the Green Pixel Value Estimation for a Red or a Blue Target Pixel As discussed herein in the previous section with respect to equations 12-15, the green pixel value for a blue or red target pixel is estimated (e.g., G'[2,2]) based on the classification of the target pixel. In an embodiment, the estimated green pixel value is smoothed, e.g., to generate a smoother image and to reduce any false color in the full color image 114.

In an example, g_smooth_mode is a variable used to control the smoothing function to smooth the estimated green pixel value G'[2,2]. The g_smooth_mode can have, for example, one of three values of 0, 1 and 2. In an example, the value of 0 corresponds to no smoothing operation being performed, the value of 1 corresponds to a relatively moderate level of smoothing, and the value of 2 corresponds to a relatively high level of smoothing. The value of g_smooth_ mode is a user configurable parameter. In the below equations, G'[2,2] smooth represents the estimated green pixel value G'[2,2] subsequent to the smoothing operation.

In an example, the smoothing operation of the estimated green pixel value G'[2,2] is performed for g_smooth_mode value of 0 as follows:

For g_smooth_mode=0, $$G'[2,2]\text{smooth}=G'[2,2]. \qquad \text{Equation 16}$$

That is, for g_smooth_mode value of 0, no smoothing operation is performed, and the smoothed estimated green pixel value G'[2,2] smooth is simply equal to the estimated green pixel value G'[2,2].

In an example, for g_smooth_mode value of 1, a variable Smooth_CD is determined as follows:

For g_smooth_mode=1, if(class_final=HORIZONTAL), then Smooth_CD=
(6*(p[2,2]−G'[2,2])+p[2,0]−G'[2,0]+p[2,4]−G'[2,4]+4)/8;

else if(class_final=VERTICAL), then Smooth_CD=
(6*(p[2,2]−G'[2,2])+p[0,2]−G'[0][2]+p[4,2]−G'[4,2]+4)/8;

else Smooth_CD=(|2*(p[2,2]−G'[2,2])+p[2,0]−G'[2,0]+p[2,4]−G'[2,4]+p[0,2]−G'[0][2]+p[4,2]−G'[4,2]+8)/16. $\qquad$ Equation 17

Subsequently, the smoothed estimated green pixel value G'[2,2] smooth is generated as follows:

$$G'[2,2]\text{smooth}=p[2,2]-\text{Smooth\_CD}. \qquad \text{Equation 18}$$

In an example, for g_smooth_mode value of 2, a variable Smooth_CD is determined as follows:

For g_smooth_mode=2, if(class_final=HORIZONTAL), then Smooth_CD=
(2*(p[2,2]−G'[2,2])+p[2,0]−G'[2,0]+p[2,4]−G'[2,4]+2)/4;

else if(class_final=VERTICAL)Smooth_CD=(2*(p[2,2]−G'[2,2])+p[0,2]−G'[0][2]+p[4,2]−G'[4,2]+2)/42;

else Smooth_CD=(4*(p[2,2]−G'[2,2])+p[2,0]−G'[2,0]+p[2,4]−G'[2,4]+p[0,2]−G'[0][2]+p[4,2]−G'[4,2]+4)/8. $\qquad$ Equation 19

Subsequently, the smoothed estimated green pixel value G'[2,2] smooth is generated as follows:

$$G'[2,2]\text{smooth}=p[2,2]-\text{Smooth\_CD}. \qquad \text{Equation 20}$$

VII. (a) Red and Blue Pixel Value Estimation for a Green (Gb) Target Pixel

As previously discussed herein, a green target pixel may be a Gb pixel and a Gr pixel. For example, in FIG. 3B, a green target pixel of the pixel window 112b has two blue pixels as its horizontal neighbors, and accordingly, the green target pixel of the pixel window 112b is referred to as a Gb pixel. In contrast, the green target pixel in the pixel window 112c of FIG. 3C has two red pixels as its horizontal neighbors, and accordingly, the green target pixel of the pixel window 112c is referred to as a Gr pixel. This section and at least some of the following sections apply to estimating a red and blue pixel value for a Gb target pixel, e.g., applies to the pixel window 112b of FIG. 3B.

VII. (b) Red and Blue Pixel Value Estimation for a Green (Gb) Target Pixel that is Classified as being in a Horizontal Edge In the pixel window 112b, assume G'[2,1] and G'[2,3] are green pixel values estimated for blue pixels (2,1) and (2,3). The green pixel values for these pixels may be estimated based on one or more of equations 12-20, as discussed in detail herein previously. For example, the G'[2,1] may be estimated using a 5×5 pixel window that is centered around the pixel (2,1), using one or more of equations 12-20. In another example and to simplify the calculations (e.g., in the case these estimated green values are not yet determined), one or more of these estimated green values may be determined by averaging pixel values of corresponding surrounding green pixels. For example, the estimated green pixel value G'[2,1] for the pixel (2,1) may be determined as G'[2,1]=(G[1,1]+G[2,0]+G[3,1]+G[2,2])/4.

Assuming that the Gb target pixel is classified as HORIZONTAL, the blue pixel value for the Gb target pixel (2,2) is estimated as follows:

$$B'[2,2]=((p[2,1]-G'[2,1])+(p[2,3]-G'[2,3]))/2+p[2,2]. \qquad \text{Equation 21}$$

Thus, the estimated blue pixel value for the target pixel (2,2) for the pixel window 122b comprises a first term (p[2,1]−G'[2,1]), which reflects the color difference between the blue pixel value and the estimated green pixel value for the pixel (2,1). The estimated blue pixel value for the target pixel (2,2) for the pixel window 122b also comprises a second term (p[2,3]−G'[2,3]), which reflects the color difference between the blue pixel value and the estimated green pixel value for the pixel (2,3). These color differences associated with the pixels (2,1) and (2,3) are relevant to the pixel (2,2), as each of the pixels (2,1), (2,3) and (2,2) are in the same horizontal pixel line, and the target pixel (2,2) is classified as being HORIZONTAL.

To calculate the red pixel value for the target pixel (2,2), assume G'[1,0], G'[1,2], G'[1,4], G'[3,0], G'[3,2], G'[3,4] are estimated green values for the corresponding pixels. These estimated green pixel values, for example, can be determined based on equations 12-20, if the estimated green pixel values are available. In another example and to simplify the calculation (e.g., in the case these estimated green values are not yet determined), one or more of these estimated green values may be determined by averaging pixel values of corresponding surrounding green pixels. For example, the estimated green pixel value G'[1,2] for the pixel (1,2) may be determined as G'[1,2]=(G[1,1]+G[0,2]+G[1,3]+G[2,2])/4. For each of the pixels (1,0), (1,2), (1,4), (3,0), (3,2) and (3,4), a corresponding color difference is determined as follows:

$$CD[1,0]=R[1,0]-G'[1,0]; \quad \text{Equation 22}$$

$$CD[1,2]=R[1,2]-G'[1,2]; \quad \text{Equation 23}$$

$$CD[1,4]=R[1,4]-G'[1,4]; \quad \text{Equation 24}$$

$$CD[3,0]=R[3,0]-G'[3,0]; \quad \text{Equation 25}$$

$$CD[3,2]=R[3,2]-G'[3,2]; \quad \text{Equation 26}$$

$$CD[3,4]=R[3,4]-G'[3,4]. \quad \text{Equation 27}$$

In equation 22, the color difference CD[1,0] for the pixel location (1,0) is a difference in the red pixel value for the pixel location (1,0) and the estimated green pixel value for the pixel location (1,0). Similarly, in equation 23, the color difference CD[1,2] for the pixel location (1,2) is a difference in the red pixel value for the pixel location (1,2) and the estimated green pixel value for the pixel location (1,2). The color differences in equations 24-27 are determined in a similar manner. It is to be noted that the pixel window 112b has six red pixels, i.e., pixels (1,0), (1,2), (1,4), (3,0), (3,2) and (3,4). The corresponding color difference for each these pixel locations are determined in equations 22-27, respectively. Assume that the color differences in equations 22-27 are in the following order:

$$CD(1)<CD(2)<CD(3)<CD(4)<CD(5)<CD(6). \quad \text{Equation 28}$$

wherein CD(1) represents the color difference that is minimum among the color differences in equations 22-27; wherein CD(6) represents the color difference that is maximum among the color differences in equations 22-27, and so on. Then, the red pixel value for the target pixel (2,2) of the pixel window 112b is estimated as follows:

$$R'[2,2]=(CD(3)+CD(4))/2+p[2,2]. \quad \text{Equation 29}$$

Thus, the estimated red pixel value for the target pixel location (2,2) in equation 29 is based on the moderate color differences CD(3) and CD(4) among the plurality of color differences of equations 22-27. The estimated red pixel value in equation 29 does not take into account the extremes (e.g., the minimum or the maximum) of the plurality of color differences of equations 22-27.

VII. (c) Red and Blue Pixel Value Estimation for a Green (Gb) Target Pixel that is Classified as being in a Vertical Edge Assume G'[0,1], G'[0,3], G'[2,1], G'[2,3], G'[4,1], G'[4,3], G'[1,2] and G'[3,2] are the estimated green pixel values for the corresponding pixels. These estimated pixel values may be generated in a manner that is similar to the discussion of generating estimated green pixel values, discussed previously immediate prior to equation 22 above. A plurality of color difference value for each of these pixel locations is defined as follows:

$$CD[0,1]=B[0,1]-G'[0,1]; \quad \text{Equation 30}$$

$$CD[0,3]=B[0,3]-G'[0,3]; \quad \text{Equation 31}$$

$$CD[2,1]=B[2,1]-G'[2,1]; \quad \text{Equation 32}$$

$$CD[2,3]=B[2,3]-G'[2,3]; \quad \text{Equation 33}$$

$$CD[4,1]=B[4,1]-G'[4,1]; \quad \text{Equation 34}$$

$$CD[4,3]=B[4,3]-G'[4,3]. \quad \text{Equation 35}$$

In equation 30, the color difference CD[0,1] for the pixel location (0,1) is a difference in the blue pixel value for the pixel location (0,1) and the estimated green pixel value for the pixel location (0,1). Similarly, in equation 31, the color difference CD[0,3] for the pixel location (0,3) is a difference in the blue pixel value for the pixel location (0,3) and the estimated green pixel value for the pixel location (0,3). The color differences in equations 32-35 are determined in a similar manner. It is to be noted that the pixel window 112b has six blue pixels, i.e., pixels (0,1), (0,3), (2,1), (2,3), (4,1) and (4,3). The corresponding color difference for each these pixel locations are determined in equations 30-35, respectively. Assume that the color differences in equations 30-35 are in the following order:

$$CD(1)<CD(2)<CD(3)<CD(4)<CD(5)<CD(6), \quad \text{Equation 36}$$

wherein CD(1) represents the color difference that is the minimum among the color differences in equations 30-35; wherein CD(6) represents the color difference that is the maximum among the color differences in equations 30-35, and so on. Then, the blue pixel value for the target pixel (2,2) of the pixel window 112b is estimated as follows:

$$B'[2,2]=(CD(3)+CD(4))/2+p[2,2]. \quad \text{Equation 37}$$

Thus, the estimated blue pixel value for the target pixel location (2,2) is based on the moderate color differences CD(3) and CD(4) among the plurality of color differences of equations 30-35. The estimated blue pixel value for the target pixel location (2,2) does not take into account the extremes (e.g., the minimum or the maximum) of the plurality of color differences of equations 30-35.

Assume G'[1,2] and G'[3,2] are estimated green pixel values for pixel locations (1,2) and (3,2), respectively. Then, the red pixel value for the target pixel (2,2) of the pixel window 112b is estimated as follows:

$$R'[2,2]=((p[1,2]-G'[1,2])+(p[3,2]-G'[3,2]))/2+p[2,2]. \quad \text{Equation 38}$$

Thus, the estimated red pixel value for the target pixel (2,2) for the pixel window 122b comprises a first term (p[1,2]–G'[1,2]), which reflects the color difference between the red pixel value for the pixel (1,1) and the estimated green pixel value for the pixel (1,1). The estimated red pixel value for the target pixel (2,2) for the pixel window 122b also comprises a second term (p[3,2]–G'[3,2]), which reflects the color difference between the red pixel value for the pixel (3,2) and the estimated green pixel value for the pixel (3,2). These color differences associated with the pixels (1,2) and (3,2) are relevant to the pixel (2,2), as each of the pixels (1,1), (3,2) and (2,2) are in the same vertical pixel line, and the target pixel (2,2) is classified as being VERTICAL.

VII. (d) Red and Blue Pixel Value Estimation for a Green (Gb) Target Pixel that is Classified as being in a Non-Edge In an embodiment, if the Gb target pixel (2,2) is classified as being in a non-edge, then the blue pixel value B'[2,2] for the Gb target pixel is estimated in a manner similar to the estimation of the blue pixel value if the Gb target pixel is classified as being in the vertical edge. That is, if the Gb target pixel (2,2) is classified as being in a non-edge, then the blue pixel value B'[2,2] for the Gb target pixel is estimated using equations 30-37.

In an embodiment, if the Gb target pixel (2,2) is classified as being in a non-edge, then the red pixel value R'[2,2] for the Gb target pixel is estimated in a manner similar to the estimation of the red pixel value if the Gb target pixel is classified as being in the horizontal edge. That is, if the Gb target pixel (2,2) is classified as being in a non-edge, then the red pixel value R'[2,2] for the Gb target pixel is estimated using equations 22-29.

VII. (e) Red and Blue Pixel Value Estimation for a Green (Gb) Target Pixel that is Classified as being in a Busy Area The color differences determined in equations 30-35 (i.e., the equations used for generating the color differences in case the Gb target pixel is in a vertical edge) are used for estimating blue pixel value for a Gb target pixel location that is classified as being in a busy area. Assume that the color differences determined in equations 30-35 are ordered in the following order:

$$CD(1) < CD(2) < CD(3) < CD(4) < CD(5) < CD(6), \quad \text{Equation 39}$$

wherein CD(1) represents the color difference that is the minimum among the color differences in equations 30-35; wherein CD(6) represents the color difference that is the maximum among the color differences in equations 30-35, and so on. Then the estimated blue pixel value for the Gb target pixel location (that is classified as being in a busy area) is generated as follows:

$$B'[2,2] = CD(1) + p[2,2]. \quad \text{Equation 40}$$

The color differences determined in equations 22-27 (i.e., the equations used for generating the color differences in case the Gb target pixel is in a horizontal edge) are used for estimating the red pixel value for the Gb target pixel location that is classified as being in a busy area. Assume that the color differences determined in equations 22-27 are ordered in the following order:

$$CD(1) < CD(2) < CD(3) < CD(4) < CD(5) < CD(6), \quad \text{Equation 41}$$

wherein CD(1) represents the color difference that is the minimum among the color differences in equations 22-27; wherein CD(6) represents the color difference that is the maximum among the color differences in equations 22-27, and so on. Then the estimated red pixel value for the Gb target pixel location (that is classified as being in a busy area) is generated as follows:

$$R'[2,2] = CD(1) + p[2,2]. \quad \text{Equation 42}$$

VIII. Red and Blue Pixel Value Estimation for a Green (Gr) Target Pixel

Some of the previous sections of this document were directed to estimation of pixel values for red and blue pixels for a Gb target pixel location. In an embodiment, the red and blue pixel values of a Gr target pixel (e.g., the target pixel of the pixel window 112c of FIG. 3C) is estimated similar to the estimation of the blue and red pixel values, respectively, of a Gb target pixel location. For example, the red pixel value of the Gr target pixel is estimated similar to the estimation of the blue pixel value of the Gb target pixel location; and the blue pixel value of the Gr target pixel is estimated similar to the estimation of the red pixel value of the Gb target pixel location. That is, the equations for estimation of red and blue pixel values associated with the Gb target pixel location are flipped or switched to generate equations for estimation of red and blue pixel values associated with the Gr target pixel location. Accordingly, generation of red and blue pixel values for the Gr target pixel location is not discussed in further details herein.

IX. Red Pixel Value Estimation for a Blue Target Pixel

Pixel window 112a has a blue target pixel. Estimation of green pixel value for the blue target pixel of the pixel window 112a has been previously discussed herein. This section discusses estimation of the red pixel value for a blue target pixel of, for example, the pixel window 112a.

Assume G'[1,1], G'[1,3], G'[3,1], G'[3,3] are the estimated green pixel values of the corresponding pixel locations. These estimated green pixel values may be generated in a manner that is similar to the discussion of generating estimated green pixel values, discussed previously immediate prior to equation 22 above. A plurality of color difference value for each of these pixel locations is defined as follows:

$$CD[1,1] = R[1,1] - G'[1,1]; \quad \text{Equation 43}$$

$$CD[1,3] = R[1,3] - G'[1,3]; \quad \text{Equation 44}$$

$$CD[3,1] = R[3,1] - G'[3,1]; \quad \text{Equation 45}$$

$$CD[3,3] = R[3,3] - G'[3,3]. \quad \text{Equation 46}$$

In equation 43, the color difference CD[1,1] for the pixel location (1,1) is a difference in the red pixel value for the pixel location (1,1) and the estimated green pixel value for the pixel location (1,1). It is to be noted that the pixel window 112a has six red pixels, i.e., pixels (1,1), (1,3), (3,1) and (3,3). The corresponding color difference for each these pixel locations are determined in equations 43-46, respectively. Assume that the color differences in equations 43-46 are in the following order:

$$CD(1) < CD(2) < CD(3) < CD(4), \quad \text{Equation 47}$$

wherein CD(1) represents the color difference that is the minimum among the color differences in equations 43-46; wherein CD(4) represents the color difference that is the maximum among the color differences in equations 43-46, and so on. Then, the red pixel value for the target pixel (2,2) of the pixel window 112a is estimated as follows:

$R'[2,2]=CD(1)+G'[2,2]$ for busy area;   Equation 48

$R'[2,2]=(CD(2)+CD(3))/2+G'[2,2]$ for non-busy area (e.g., for vertical edge, horizontal edge and non-edge area).   Equation 49

Thus, in equation 48, the estimated red pixel value is based on the minimum of the color differences in equations 43-46, if the target pixel is classified as being BUSY. In equation 49, the estimated red pixel value is based on the moderate color differences (i.e., CD(2) and CD(3)) of the color differences in equations 43-46, if the target pixel is not classified as being BUSY (e.g., is classified to be included in a vertical edge, in a horizontal edge or in a non-edge area).

X. Blue Pixel Value Estimation for a Red Target Pixel

Although none of FIGS. 3A-3C illustrate a pixel window with a red target pixel, a pixel window of the source image 112 can be a red pixel. In case a pixel window has a red target pixel, the blue pixel value for the target pixel is estimated similar to the estimation of the red pixel value for a blue target pixel, with the red and blue color flipped or interchanged. For example, the above discussed equations 43-49 are directed to the estimation of red pixel value for a blue target pixel. In an embodiment, the same equations, but with the red interchanged with blue, is used to estimate the blue pixel value for a red target pixel. Accordingly, the estimations for estimating the blue pixel value for the red target pixel are not discussed in further detail herein.

XI. Method of Operation

Figure 6:
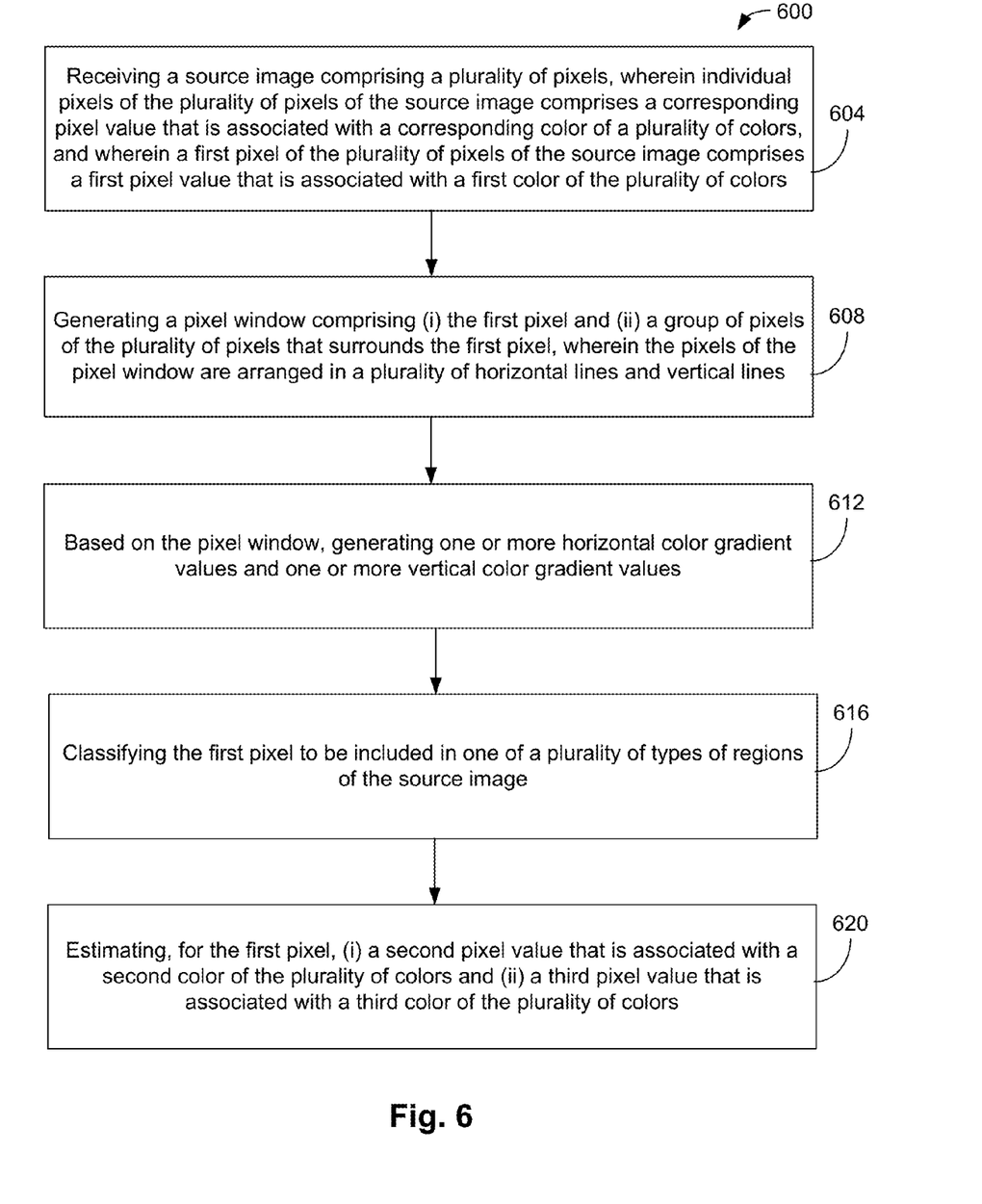
FIG. 6 is a flow diagram of an example method of demosaicing an image generated via a color filter array.

FIG. 6 is a flow diagram of an example method 600 of demosaicing an image generated via a color filter array (e.g., the source image 112). At 604, a source image (e.g., the source image 112 of FIG. 1) is received (e.g., by the module 106 and from the image sensor 104). In an embodiment, the source image comprises a plurality of pixels, wherein individual pixels of the plurality of pixels of the source image comprises a corresponding pixel value that is associated with a corresponding color of a plurality of colors, and wherein a first pixel of the plurality of pixels of the source image comprises a first pixel value that is associated with a first color of the plurality of colors.

At 608, a pixel window (e.g., one of the pixel windows 112a, 112b or 112c) is generated (e.g., by the pixel window generation module 440 of FIG. 4). In an embodiment, the pixel window comprises (i) the first pixel and (ii) a group of pixels of the plurality of pixels that surrounds the first pixel, wherein the pixels of the pixel window are arranged in a plurality of horizontal lines and vertical lines.

At 612, based on the pixel window, one or more horizontal color gradient values and one or more vertical color gradient values are generated (e.g., by the color gradient generation module 444 of FIG. 4). At 616, based on the one or more horizontal color gradient values and the one or more vertical color gradient values, the first pixel is classified (e.g., by the pixel classification module 448 of FIG. 4) to be included in one of a plurality of types of regions of the source image. At 620, based on classifying the first pixel to be included in one of the plurality of types of regions of the source image, for the first pixel, (i) a second pixel value that is associated with the second color of the plurality of colors and (ii) a third pixel value that is associated with the third color of the plurality of colors is estimated (e.g., by the pixel value estimation module 452 of FIG. 4), thereby demosaicing the first pixel of the source image.

XII. Conclusion

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:
1. A method comprising:
receiving a source image comprising a plurality of pixels, wherein individual pixels of the plurality of pixels of the source image comprise a corresponding pixel value that is associated with a corresponding color of a plurality of colors, and wherein a first pixel of the plurality of pixels of the source image comprises a first pixel value that is associated with a first color of the plurality of colors; and
for the first pixel of the plurality of pixels of the source image, estimating (i) a second pixel value that is associated with a second color of the plurality of colors and (iii) a third pixel value that is associated with a third color of the plurality of colors, wherein estimating the second pixel value and the third pixel value comprises:
  generating a pixel window comprising (i) the first pixel and (ii) a group of pixels of the plurality of pixels that surrounds the first pixel,
  based on the pixel window, generating one or more horizontal color gradient values and one or more vertical color gradient values,
  based on the one or more horizontal color gradient values and the one or more vertical color gradient values, classifying the first pixel to be included in one of a plurality of types of regions of the source image, and
  based on classifying the first pixel, estimating, for the first pixel, (i) the second pixel value that is associated with the second color of the plurality of colors and (ii) the third pixel value that is associated with the third color of the plurality of colors, wherein generating the one or more horizontal color gradient values and one or more vertical color gradient values comprises generating a first horizontal color gradient value by:
- generating a first color gradient based on a corresponding color difference between two or more corresponding horizontal pixels of the first color,
- generating a second color gradient based on a corresponding color difference between two or more corresponding horizontal pixels of the second color,
- generating a third color gradient based on a corresponding color difference between two or more corresponding horizontal pixels of the third color, and
- based at least in part on a sum of (i) the first color gradient, (ii) the second color gradient and (iii) the third color gradient, generating the first horizontal color gradient value.

2. The method of claim 1, further comprising:
generating the source image using a color filter array and an image sensor,
wherein the image sensor comprises a plurality of pixel sensors,
wherein the color filter array comprises a plurality of color filters,
wherein each color filter of the plurality of color filters of the color filter array is configured to output light of a corresponding color of the plurality of colors,
wherein each color filter of the plurality of color filters of the color filter array is overlaid over a corresponding pixel sensor of the plurality of pixel sensors of the image sensor,
wherein a first color filter of the plurality of color filters of the color filter array is configured to (i) output light of the first color and (ii) be overlaid over a first pixel sensor of the plurality of pixel sensors of the image sensor, and
wherein the first pixel sensor of the plurality of pixel sensors of the image sensor generates the first pixel value of the first pixel of the source image.

3. The method of claim 2, wherein the plurality of color filters comprises a first number of red color filters, a second number of blue color filters, and a third number of green color filters, wherein the third number is substantially higher than each of the first number and the second number.

4. The method of claim 1, wherein the plurality of types of regions of the source image comprises a vertical edge area of the source image, a horizontal edge area of the source image, a non-edge area of the source image, and a busy area of the source image.

5. The method of claim 1, wherein classifying the first pixel to be included in one of the plurality of types of regions of the source image comprises:
- generating an initial classification of the first pixel in which the first pixel is initially classified to be included in one of the plurality of types of regions of the source image; and
- selectively refining the initial classification of the first pixel to generate a final classification of the first pixel.

6. The method of claim 5, wherein selectively refining the initial classification for the first pixel to generate the final classification of the first pixel further comprises:
- in response to the first pixel being initially classified to belong to a first type of region of the plurality of types of regions of the source image, refining the initial classification of the first pixel to generate the final classification of the first pixel; and
- in response to the first pixel being initially classified to belong to a second type of region of the plurality of types of regions of the source image, refraining from refining the initial classification of the first pixel such that the final classification of the first pixel is the same as the initial classification of the first pixel.

7. The method of claim 6, wherein:
the first type of region of the plurality of types of regions of the source image comprises a non-edge region of the plurality of types of regions of the source image; and
the second type of region of the plurality of types of regions of the source image comprises one of a vertical edge region, a horizontal edge region or a busy area region of the source image.

8. The method of claim 1, wherein the first color is one of a red color or a blue color, wherein the second color is a green color, and wherein estimating the second pixel value that is associated with the second color of the plurality of colors comprises:
in response to the first pixel being classified to be included in a horizontal edge region of the source image, estimating, for the first pixel, the green pixel value based on
- (i) an average of green pixel values of a second pixel and a third pixel, the second and third pixels being immediate horizontal neighbor of the first pixel, and
- (ii) a difference between (A) the first pixel value of the first pixel and (B) a sum of pixel values of a fourth pixel and a fifth pixel, wherein the first, second, third, fourth and fifth pixels are in a same horizontal pixel line of the source image.

9. The method of claim 1, wherein the first color is one of a red color or a blue color, wherein the second color is a green color, and wherein estimating the second pixel value that is associated with the second color of the plurality of colors comprises:
in response to the first pixel being classified to be included in a vertical edge region of the source image, estimating, for the first pixel, the green pixel value based on
- (i) an average of green pixel values of a second pixel and a third pixel, the second and third pixels being immediate vertical neighbor of the first pixel, and
- (ii) a difference between (A) the first pixel value of the first pixel and (B) a sum of pixel values of a fourth pixel and a fifth pixel, wherein the first, second, third, fourth and fifth pixels are in a same vertical pixel line of the source image.

10. A method comprising:
receiving a source image comprising a plurality of pixels, wherein individual pixels of the plurality of pixels of the source image comprise a corresponding pixel value that is associated with a corresponding color of a plurality of colors, and wherein a first pixel of the plurality of pixels of the source image comprises a first pixel value that is associated with a first color of the plurality of colors, wherein the first color is one of a red color or a blue color; and
for the first pixel of the plurality of pixels of the source image, estimating (i) a second pixel value that is associated with a second color of the plurality of colors and (iii) a third pixel value that is associated with a third color of the plurality of colors, wherein the second color is a green color of the plurality of colors, and wherein estimating the second pixel value that is associated with the second color of the plurality of colors comprises:

generating a pixel window comprising (i) the first pixel and (ii) a group of pixels of the plurality of pixels that surrounds the first pixel, based on the pixel window, generating one or more horizontal color gradient values and one or more vertical color gradient values, based on the one or more horizontal color gradient values and the one or more vertical color gradient values, classifying the first pixel to be included in one of a plurality of types of regions of the source image, in response to the first pixel being classified to be included in a busy region of the source image, generating a plurality of color differences, wherein each color difference is based on a difference between (i) a pixel value of a corresponding second pixel of the pixel window and (ii) a sum of pixel values of a corresponding third pixel and a corresponding fourth pixel of the pixel window, wherein the third pixel, the second pixel and the fourth pixel are consecutive pixels in the source image, ordering the plurality of color differences based on a corresponding value of each of the plurality of color differences such that the plurality of color differences comprises (i) a minimum one of the plurality of color differences, (ii) two or more moderate ones of the plurality of color differences, and (iii) a maximum one of the plurality of color differences, and estimating, for the first pixel, the second pixel value based on an average of the two or more moderate ones of the plurality of color differences.

11. A method comprising:

receiving a source image comprising a plurality of pixels, wherein individual pixels of the plurality of pixels of the source image comprise a corresponding pixel value that is associated with a corresponding color of a plurality of colors, and wherein a first pixel of the plurality of pixels of the source image comprises a first pixel value that is associated with a first color of the plurality of colors; and for the first pixel of the plurality of pixels of the source image, estimating (i) a second pixel value that is associated with a second color of the plurality of colors and (iii) a third pixel value that is associated with a third color of the plurality of colors, wherein the first color is a blue color, wherein the second color is a green color, wherein the third color is a red color, and wherein estimating the third pixel value that is associated with the third color of the plurality of colors comprises:

generating a pixel window comprising (i) the first pixel and (ii) a group of pixels of the plurality of pixels that surrounds the first pixel, based on the pixel window, generating one or more horizontal color gradient values and one or more vertical color gradient values, based on the one or more horizontal color gradient values and the one or more vertical color gradient values, classifying the first pixel to be included in one of a plurality of types of regions of the source image, generating a plurality of color differences, wherein each color difference is associated with a corresponding red pixel of the pixel window, wherein each color difference is based on a difference between (i) the corresponding red pixel value of the corresponding red pixel of the pixel window and (ii) an estimated green pixel value of the corresponding red pixel of the pixel window, ordering the plurality of color differences based on a corresponding value of each of the plurality of color differences such that the plurality of color differences comprises (i) a minimum one of the plurality of color differences, (ii) two or more moderate ones of the plurality of color differences, and (iii) a maximum one of the plurality of color differences, and estimating, for the first pixel, the third pixel value based on (i) the ordered plurality of color differences and (ii) classifying the first pixel to be included in one of the plurality of types of regions of the source image.

12. The method of claim 11, wherein estimating the third pixel value that is associated with the third color of the plurality of colors comprises:

in response to the first pixel being classified to be not included in a busy region of the source image, estimating, for the first pixel, the third pixel value based on an average of the two or more moderate ones of the plurality of color differences.

13. The method of claim 11, wherein estimating the third pixel value that is associated with the third color of the plurality of colors comprises:

in response to the first pixel being classified to be included in the busy region of the source image, estimating, for the first pixel, the third pixel value based on the minimum of the plurality of color differences.

* * * * *